US010911124B1

(12) United States Patent

Park et al.

(10) Patent No.: US 10,911,124 B1
(45) Date of Patent: Feb. 2, 2021

(54) METHOD AND SYSTEM FOR SINGLE CARRIER WIDEBAND HYBRID BEAMFORMING BASED ON LIMITED FEEDBACK

(71) Applicant: Korea Advanced Institute of Science and Technology, Daejeon (KR)

(72) Inventors: Hyuncheol Park, Daejeon (KR); Girim Kwon, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 16/745,299

(22) Filed: Jan. 16, 2020

(30) Foreign Application Priority Data

Oct. 16, 2019 (KR) ........................ 10-2019-0128488

(51) Int. Cl.
*H04B 7/06* (2006.01)

(52) U.S. Cl.
CPC ........... *H04B 7/0634* (2013.01); *H04B 7/066* (2013.01); *H04B 7/0617* (2013.01)

(58) Field of Classification Search
CPC ...... H04B 7/04; H04B 7/0404; H04B 7/0413; H04B 7/0417; H04B 7/0452; H04B 7/06; H04B 7/0613; H04B 7/0617; H04B 7/0619; H04B 7/0621; H04B 7/0626; H04B 7/063; H04B 7/0632; H04B 7/0634; H04B 7/0636; H04B 7/0643; H04B 7/066
See application file for complete search history.

(56) References Cited

U.S. PATENT DOCUMENTS 9,356,809 B2 * 5/2016 Park .................. H04L 25/03898
10,033,451 B2 * 7/2018 Cho .......................... H04B 7/10
2011/0150114 A1 * 6/2011 Miao .................... H04B 7/0417 375/260
2014/0241179 A1 * 8/2014 Arulprakasam ...... H04W 24/08 370/252
2015/0103686 A1 * 4/2015 Lim ..................... H04B 7/0617 370/252
2019/0013983 A1 * 1/2019 Gao ..................... H04B 7/0617

FOREIGN PATENT DOCUMENTS

KR 10-2015-0043368 4/2015
KR 10-2016-0138115 12/2016
KR 10-2017-0082263 7/2017

OTHER PUBLICATIONS

Office Action issued in Korean Patent Application No. 10-2019-0128488 dated Aug. 4, 2020.

* cited by examiner

*Primary Examiner* — Siu M Lee
(74) *Attorney, Agent, or Firm* — Foley & Lardner LLP

(57) ABSTRACT

A communication system and an operating method thereof are for single carrier wideband hybrid beamforming based on limited feedback. A transmitter having a plurality of Tx antennas may be configured to receive limited channel information from at least one receiver each having at least one Rx antenna, schedule a RF beam for at least one stream in the receiver using the limited channel information, and perform baseband beamforming based on the RF beam.

20 Claims, 7 Drawing Sheets

METHOD AND SYSTEM FOR SINGLE CARRIER WIDEBAND HYBRID BEAMFORMING BASED ON LIMITED FEEDBACK

CROSS REFERENCE TO RELATED APPLICATION

This application is based on and claims priority under 35 U.S.C. 119 to Korean Patent Application No. 10-2019-0128488, filed on Oct. 16, 2019, in the Korean Intellectual Property Office, the disclosures of which is herein incorporated by reference in their entireties.

BACKGROUND OF THE INVENTION

1. Technical Field

Various embodiments relate to a method and system for single carrier wideband hybrid beamforming based on limited feedback.

2. Description of the Related Art

A beamforming technology is a technology for focusing a transmission signal on a specific direction using multiple antennas. In particular, in a high frequency channel, such as mmWave communication considered in a 5G mobile communication system, high path attenuation can be overcome through beamforming and space resources can be efficiently used by forming a narrow beam width using multiple antennas. In order to apply the existing digital MIMO technology using multiple antennas, RF chains corresponding to the number of antennas are necessary. However, if multiple antennas are used, a system implementation is made impossible because hardware complexity and power consumption are significantly increased.

A transmitter needs to have channel state information (CSI) feedback from a receiver in order to design beamforming. However, in a large-scale antenna system using tens or hundreds of antennas, high feedback overhead is unrealistically necessary due to a too large channel size.

A mmWave beamforming system, that is, a core technology of a 5G mobile communication system, uses a wide range of frequency resources, and thus a radio channel has a wideband or frequency selective characteristic. In the existing mobile communication system, an orthogonal frequency division multiplexing (OFDM) technology is a lot used to overcome the wideband characteristic of a channel. Accordingly, a given ratio of overhead is necessary because a cyclic prefix is used to remove inter-symbol interference.

SUMMARY OF THE INVENTION

Various embodiments provide a communication system capable of reducing feedback overhead from a receiver to a transmitter and an operating method thereof.

Various embodiments provide a communication system capable of reducing hardware complexity and power consumption while using multiple antennas and an operating method thereof.

Various embodiments provide a communication system capable of controlling inter-symbol interference and an operating method thereof.

A communication system and an operating method thereof according to various embodiments provide a method and system for single carrier wideband hybrid beamforming based on limited feedback.

A communication system according to various embodiments may include at least one receiver including at least one receive (Rx) antenna and configured to feedback limited channel information and a transmitter including a plurality of transmit (Tx) antennas and configured to receive the limited channel information, schedule a radio frequency (RF) beam for at least one stream in the receiver using the limited channel information, and perform baseband beamforming based on the RF beam.

An operating method of a communication system according to various embodiments may include receiving, by a transmitter including a plurality of transmit (Tx) antennas, limited channel information from at least one receiver each including at least one receive (Rx) antenna, scheduling, by the transmitter, a RF beam for at least one stream in the receiver using the limited channel information, and performing, by the transmitter, baseband beamforming based on the RF beam.

DETAILED DESCRIPTION

Hereinafter, various embodiments of this document are described with reference to the accompanying drawings.

Figure 1:
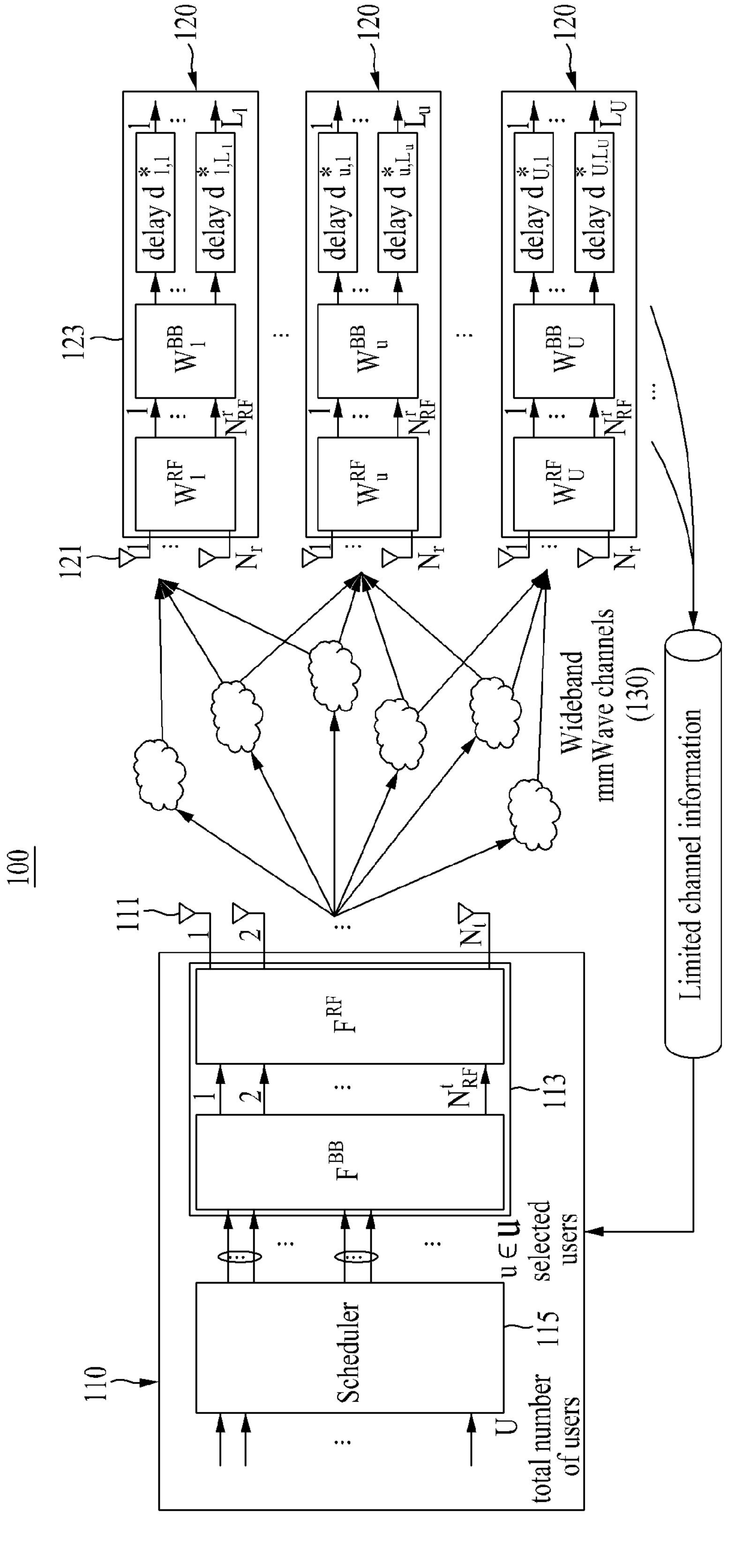
FIG. 1 is a diagram illustrating a communication system according to various embodiments.

FIG. 1 is a diagram illustrating a communication system 100 according to various embodiments.

Referring to FIG. 1, the communication system 100 according to various embodiments may be implemented as a wideband mmWave beamforming system of a 5G mobile communication system, and may include a transmitter 110 and at least one, for example, U receivers 120. In this case, the transmitter 110 and the receiver 120 may transmit and receive signals through a plurality of wideband mmWave channels 130.

The transmitter 110 may include a plurality of transmit (Tx) antennas, for example, $N_t$ Tx antennas 111. For example, the transmitter 110 may include a base station (BS). The transmitter 110 may perform beamforming for at least one of the receivers 120 using limited channel information feedback from each of the receivers 120, and may transmit a signal to the receiver 120.

The transmitter 110 may further include a transmission processor 113 and a scheduler 115. The transmission processor 113 may include transmission processors, such as a plurality of RF antennas, for example, $N_{RF}^t$ RF chains. In this case, the number of transmission processors, for example, $N_{RF}^t$ may be equal to the number of Tx antennas 111, for example, $N_t$, or may be smaller than the number of Tx antennas 111, for example, $N_t$. The scheduler 115 may select at least any one, for example, K receivers 120 among all, that is, the U receivers 120. The scheduler 115 may not allocate or allocate at least one, for example, $L_u(0 \le L_u \le N_{RF}^{f})$ stream to the selected receiver 120. In this case, the number of streams for the selected receiver 120 may be represented as a spatial multiplexing number. Furthermore, the number of stream allocated in the transmitter 110 may be represented as a total number of stream for the selected receiver 120

$$\left(L\square\sum_{u=1}^{U} L_u\right).$$

According to various embodiments, the transmitter 110 may transmit a signal using baseband beamforming and RF beamforming. The transmitter 110 may perform baseband beamforming based on a baseband beamforming matrix ($F^{BB}=[F_1^{BB}, \ldots, F_U^{BB}]\in\square^{N_{RF}^{t}\times L}$) in accordance with the number of transmission processors, for example, $N_{RF}^{t}$, and may perform RF beamforming based on an RF beamforming matrix ($F^{RF}\in\square^{N_t\times N_{RF}^{t}}$) in accordance with the number of Tx antennas 111, for example, $N_t$.

The receiver 120 may include at least one receive (Rx) antenna, for example, $N_r$ Rx antennas 121. For example, the receiver 120 is a user equipment, and may include at least one of a portable communication device, a computer device, a portable multimedia device, a portable medical device, a camera, a wearable device, or home appliances. The receiver 120 may feedback limited channel information to the transmitter 110. Furthermore, the receiver 120 may perform beamforming, and thus may receive a signal from the transmitter 110.

The receiver 120 may further include a reception processor 123. The reception processor 123 may include reception processors, such as a plurality of RF chains, for example, $N_{RF}^{r}$ RF chains. In this case, the number of reception processors, for example, $N_{RF}^{r}$ may be equal to the number of Rx antennas 121, for example, $N_r$ or may be smaller than the number of Rx antennas 121, for example, $N_r$.

According to one embodiment, the receiver 120 may receive a signal using RF beamforming. The receiver 120 may perform RF beamforming based on an RF beamforming matrix ($W_u^{RF}\in\square^{N_r\times N_{RF}^{r}}$) in accordance with the number of Rx antennas 121, for example, $N_r$. According to another embodiment, the receiver 120 may receive a signal using RF beamforming and baseband beamforming. The receiver 120 may perform RF beamforming based on the RF beamforming matrix ($W_u^{RF}\in\square^{N_r\times N_{RF}^{r}}$) in accordance with the number of Rx antennas 121, for example, $N_r$, and may additionally perform baseband beamforming based on a baseband beamforming matrix ($W_u^{BB}\in\square^{N_{RF}^{r}\times L_u}$) in accordance with the number of reception processors, for example, $N_{RF}^{r}$. Furthermore, the reception processor 123 may receive at least one stream, for example, $L_u$ streams allocated to the receiver 120, and may compensate for a delay of a channel path for the stream, that is, a delay value. In FIG. 1, "delay $d^*_{u,n}$," may mean that a delay of a channel path value $d^*_{u,n}$ for the n-th stream of a u-th receiver 120 is compensated for.

According to various embodiments, a delay-d multiple input multiple output (MIMO) channel matrix ($H_{u,d}\in\square^{N_r\times N_t}$, d=0, . . . , D−1) may be given between the transmitter 110 and any one of the receivers 120, that is, the u-th receiver 120 like Equation 1.

$$H_{u,d} = \sqrt{\frac{\tilde{H}_u N_t N_r}{N_{cl} N_{ray}}} \sum_{i=1}^{N_{cl}} \sum_{l=1}^{N_{ray}} \alpha_{u,i,l} P_{rc}(dT_s - \tau_{u,i,l}) a_r(\theta^r_{u,i,l}, \phi^r_{u,i,l}) a_t(\theta^t_{u,i,l}, \phi^t_{u,i,l})^H, \quad d = 0, \ldots, D-1 \qquad \text{[Equation 1]}$$

In Equation 1, $\tilde{H}_u$ indicates a large-scale channel gain. $N_{cl}$ indicates the number of clusters of scatters present in a channel. $N_{ray}$ indicates the number of multiple path components present within a single cluster. $\alpha_{u,i,l}$ indicates a path gain. $p_{rc}(\tau)$ indicates a raised-cosine pulse-shaping function at $\tau$ seconds for a $T_s$ interval signal. $\theta_{u,i,l}^{t}/\phi_{u,i,l}^{t}$ indicates an elevation/azimuth angle of each path component that goes out to the Tx antennas. $\theta_{u,i,l}^{r}/\phi_{u,i,l}^{r}$, indicates an elevation/azimuth angle of each path component that enters the Rx antenna. $a_t(\bullet)/a_r(\bullet)$ indicates the normalized array response vector of a Tx/Rx antenna. $a_t(\bullet)/a_r(\bullet)$ may be determined depending on the type of array antenna.

According to various embodiments, a received signal of the u-th receiver 120 in a time index k may be represented like Equation 2. In this case, if the receiver 120 uses RF beamforming and baseband beamforming, the received signal of the receiver 120 may be represented like Equation 3. In this case, assuming that a delay for an n-th received stream of a u-th user is $d^*_{u,n}$, the received signal may be represented like Equation 4 by compensating for the delay.

$$y_u[k] = \sum_{d=0}^{D-1} H_{u,d} F^{RF} F^{BB} P x[k-d] + n_u[k], \quad u \in U \subseteq \{u, \ldots, U\} \qquad \text{[Equation 2]}$$

In Equation 2, P (P=diag( . . . , $p_{u,n}$, . . . )) may indicates a diagonal matrix indicative of Tx power allocation by the transmitter 110, and may satisfy $Tr(P)\le P_t$. P may indicate maximum Tx power of a base station (BS). x may indicate the transmission signal vector of a signal transmitted by the transmitter 110. $n_u[k]$ may indicate the noise vector of the u-th receiver 120 in a k-th time index.

$$\tilde{y}_u[k] = \sum_{d=0}^{D-1} (W_u^{BB})^H (W_u^{RF})^H H_{u,d} F^{RF} F^{BB} P x[k-d] + (W_u^{BB})^H (W_u^{RF})^H n_u[k] \qquad \text{[Equation 3]}$$

$$\begin{aligned} \overline{y}_u[k] &= [\overline{y}_{u,1}[k], \ldots, \overline{y}_{u,L_u}[k]]^T \\ &= [\tilde{y}_{u,1}[k+d^*_{u,1}], \ldots, \tilde{y}_{u,L_u}[k+d^*_{u,L_u}]]^T \end{aligned} \qquad \text{[Equation 4]}$$

In Equation 4, $\overline{y}_{u,n}[k]$ may be represented like Equation 5.

$$\begin{aligned} y_{u,n}[k] &= \tilde{y}_{u,n}[k+d^*_{u,n}] \\ &= p_{u,n}(w_{u,n}^{BB})^H (W_u^{RF})^H H_{u,d^*_{u,n}} F^{RF} f_{u,n}^{BB} x_{u,n}[k] \\ &\quad + \sum_{d=0, d\ne d^*_{u,n}}^{D-1} p_{u,n}(w_{u,n}^{BB})^H (W_u^{RF})^H H_{u,d} F^{RF} f_{u,n}^{BB} x_{u,n} \end{aligned} \qquad \text{[Equation 5]}$$

-continued $$[k + d_{u,n}^* - d]$$

$$+ \sum_{l=1, l\neq n}^{L_u} \sum_{d=0}^{D-1} p_{u,l}(w_{u,n}^{BB})^H (W_u^{RF})^H H_{u,d} F^{RF} f_{u,l}^{BB} x_{u,l}$$

$$[k + d_{u,n}^* - d]$$

$$+ \sum_{j \in U, j \neq u} \sum_{l=1}^{L_j} \sum_{d=0}^{D-1} p_{j,l}(w_{u,n}^{BB})^H (W_u^{RF})^H H_{u,d} F^{RF}$$

$$f_{j,l}^{BB} x_{j,l}[k + d_{u,n}^* - d]$$

$$+ (w_{u,n}^{BB})^H (W_u^{RF})^H n_u [k + d_{u,n}^*]$$

In this case, $P_n$ may indicate noise power.

According to various embodiments, the communication system 100 may be based on a hybrid beamforming technology for maximizing a weighted sum rate like Equation 6 so that importance for each user, that is, for each receiver 120, can be incorporated.

$$R = \sum_{u \in U} q_u R_u = \sum_{u \in U} q_u \sum_{n=1}^{L_u} \log_2(1 + SINR_{u,n}) \quad [\text{Equation 6}]$$

In Equation 6, $q_u$ is the weight of a u-th user, that is, the receiver 120. The SINR may be calculated like Equation 7.

$$SINR_{u,n} = \frac{p_{u,n}|(w_{u,n}^{BB})^H (W_u^{RF})^H H_{u,d_{u,n}^*} F^{RF} f_{u,n}^{BB}|^2}{P_I + P_n} \quad [\text{Equation 7}]$$

In Equation 7, $P_I$ may be calculated like Equation 8.

$$P_I \square \sum_{d=0, d \neq d_{u,n}^*}^{D-1} p_{u,n}|(w_{u,n}^{BB})^H (W_u^{RF})^H H_{u,d} F^{RF} f_{u,n}^{BB}|^2$$

$$+ \sum_{l=1, l\neq n}^{L_u} \sum_{d=0}^{D-1} p_{u,l}|(w_{u,n}^{BB})^H (W_u^{RF})^H H_{u,d} F^{RF} f_{u,l}^{BB}|^2$$

$$+ \sum_{j \in U, j\neq u} \sum_{l=1}^{L_j} \sum_{d=0}^{D-1} p_{j,l}|(w_{u,n}^{BB})^H (W_u^{RF})^H H_{u,d} F^{RF} f_{j,l}^{BB}|^2$$

[Equation 8]

Figure 2:
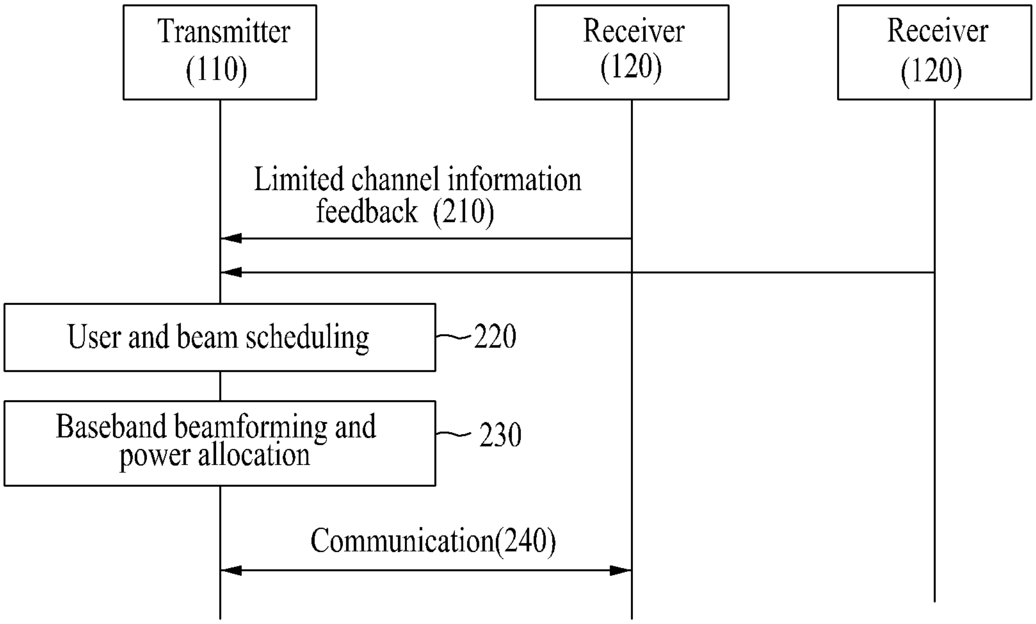
FIG. 2 is a diagram illustrating an operating method of a communication system according to various embodiments.

FIG. 2 is a diagram illustrating an operating method of the communication system 100 according to various embodiments.

Referring to FIG. 2, at operation 210, each of all receivers, that is, each of the U receivers 120, may feedback limited channel information to the transmitter 110. Each of the receivers 120 may detect a channel matrix with the transmitter 110. The channel matrix may be configured with a plurality of delay components. Each of the receivers 120 may extract beam space channel coefficients for each delay component of the channel matrix. Each of the receivers 120 may extract a predetermined number of elements from the beam space channel coefficients. Each of the receivers 120 may configure limited channel information using extracted elements with respect to all the delay components of the channel matrix. Each of the receivers 120 may transmit the limited channel information to the transmitter 110. Accordingly, the transmitter 110 may receive the limited channel information from all receivers, that is, the U receivers 120.

At operation 220, the transmitter 110 may schedule a RF beam for at least one stream in the receiver 120 using the limited channel information. In this case, the transmitter 110 may schedule the transmitter 110 and a RF beam therefor in a beam domain so that inter-symbol interference and inter-stream interference are mitigated. Furthermore, the transmitter 110 may configure the RF beamforming matrix ($F^{RF}$) of the transmitter 110 and the RF beamforming matrix ($W_u^{RF}$) of the receiver 120.

At operation 230, the transmitter 110 may perform baseband beamforming based on the RF beam. In this case, the transmitter 110 may design the baseband beamforming matrix ($F^{BB}$) of the transmitter 110. Specifically, the transmitter 110 may design the baseband beamforming matrix ($F^{BB}$) of the transmitter 110 using the RF beamforming matrix ($F^{RF}$) of the transmitter 110 and the RF beamforming matrix ($W_u^{RF}$) of the receiver 120. Furthermore, the transmitter 110 may allocate power to the RF beamforming matrix ($F^{RF}$) and baseband beamforming matrix ($F^{BB}$) of the transmitter 110.

At operation 240, the transmitter 110 and the receiver 120 may communicate with each other. In this case, the transmitter 110 may transmit a signal by performing baseband beamforming based on the baseband beamforming matrix ($F^{BB}$) and performing RF beamforming based on the RF beamforming matrix ($F^{RF}$). According to one embodiment, the receiver 120 may receive a signal using RF beamforming. The receiver 120 may perform RF beamforming based on an RF beamforming matrix ($W_u^{RF} \in \square^{N_r \times N_{RF}^r}$) in accordance with the number of Rx antennas 121, for example, $N_r$. According to another embodiment, the receiver 120 may receive a signal using RF beamforming and baseband beamforming. The receiver 120 may perform RF beamforming based on the RF beamforming matrix ($W_u^{RF} \in \square^{N_r \times N_{RF}^r}$) in accordance with the number of Rx antennas 121, for example, $N_r$, and may additionally perform baseband beamforming based on a baseband beamforming matrix ($W_u^{BB} \in \square^{N_{RF}^r \times L_u}$) in accordance with the number of reception processors, for example, $N_{RF}^r$.

Figure 3:
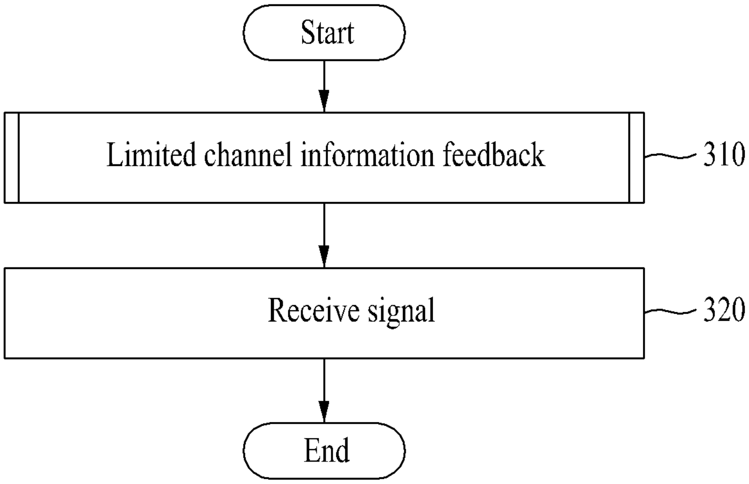
FIG. 3 is a diagram illustrating an operating method of a receiver according to various embodiments.

FIG. 3 is a diagram illustrating an operating method of the receiver 120 according to various embodiments.

Referring to FIG. 3, at operation 310, the receiver 120 may feedback limited channel information to the transmitter 110. The receiver 120 may include at least one Rx antenna, for example, $N_r$ Rx antennas 121. For example, the receiver 120 is a user equipment, and may include at least one of a portable communication device, a computer device, a portable a multimedia device, a portable medical device, a camera, a wearable device, or home appliances.

Figure 4:
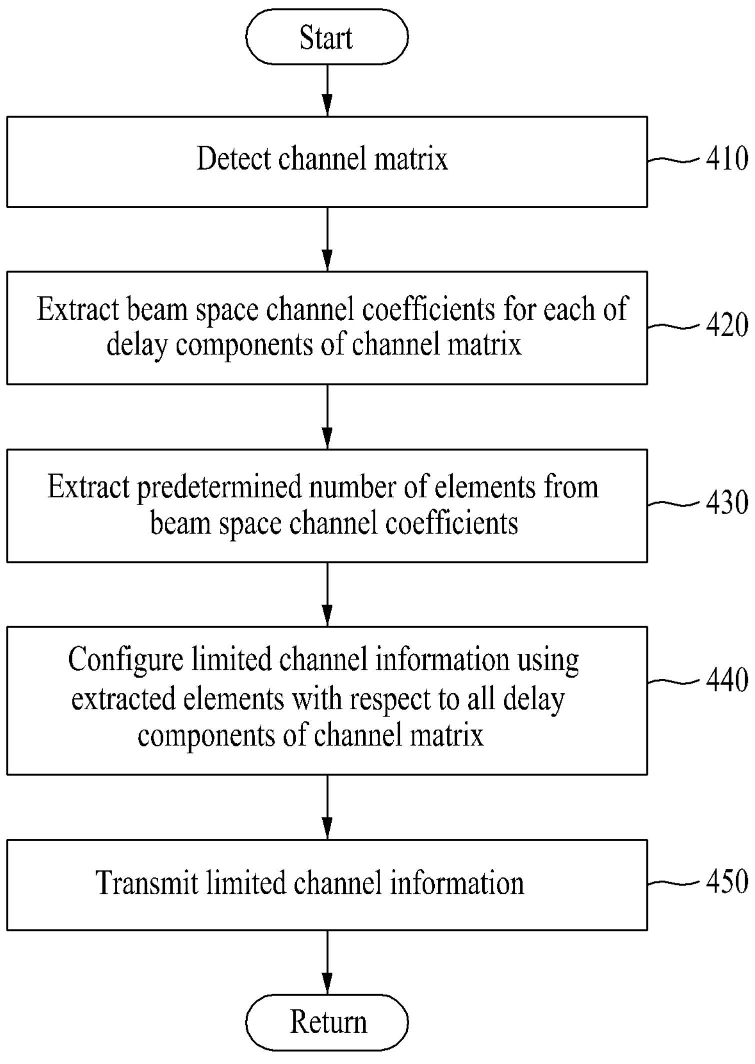
FIG. 4 is a diagram illustrating a limited channel information feedback operation of FIG. 3.

FIG. 4 is a diagram illustrating a limited channel information feedback operation of FIG. 3.

Referring to FIG. 4, at operation 410, the receiver 120 may detect a channel matrix. The channel matrix may be configured with a plurality of delay components, for example, D delay components. At operation 420, the receiver 120 may extract beam space channel coefficients for each of the delay components of the channel matrix. The receiver 120 may convert each of the delay components into a beam domain representation. In this case, the receiver 120 may detect a d-th delay component like Equation 9 by decomposing the channel matrix using orthogonal bases. Furthermore, the receiver 120 may extract a beam space channel coefficient ($s_{u,d} \in \square^{N_t N_r \times 1}, \forall d$) like Equation 10 based on Equation 9.

$$H_{u,d} = \sum_{n=1}^{N_r}\sum_{m=1}^{N_t} [\bar{H}_{u,d}]_{n,m} a_r(\bar{u}_n^r, \bar{v}_n^r) a_t(\bar{u}_m^t, \bar{v}_m^t)^H = \sum_{i=1}^{N_rN_t} s_{u,d,i} H^{(i)} \quad \text{[Equation 9]}$$

In Equation 9, $(\bar{u}_n^r,\bar{v}_n^r)$, $(\bar{u}_m^t,\bar{v}_m^t)$ may indicate uniformly sampled virtual angles in a directional cosine domain in order to form orthogonal basis matrices $H^{(i)}$. $s_{u,d,i}$ may indicate a beam space channel coefficient and may be represented as a vector like Equation 10.

$$S_{u,d} \square vec(\bar{H}_{u,d}^t) = [S_{u,d,1}, \ldots, S_{u,d,N_tN_r}]^T \quad \text{[Equation 10]}$$

In this case, a beam codebook, such as Equation 11, may be defined using an RF beamforming vector corresponding to $a_r(\bar{u}_n^r,\bar{v}_n^r)$ and $a_t(\bar{u}_m^t,\bar{v}_m^t)$ in Equation 9.

$$F_{RF} \square \{\bar{f}_1, \ldots, \bar{f}_{N_t}\} = \{a_t(\bar{u}_m^t,\bar{v}_m^t) | m=1, \ldots, N_t\}$$

$$F_{RF} \square \{\bar{w}_1, \ldots, \bar{w}_{N_r}\} = \{a_r(\bar{u}_n^r,\bar{v}_n^r) | n=1, \ldots, N_r\} \quad \text{[Equation 11]}$$

At operation 430, the receiver 120 may extract a predetermined number of elements, for example, $N_f$ elements from the beam space channel coefficients. At operation 440, the receiver 120 may configure limited channel information using the extracted elements with respect to all the delay components of the channel matrix. In this case, the receiver 120 may configure the limited channel information using $N_fD$ elements, for example. At operation 450, the receiver 120 may transmit the limited channel information to the transmitter 110. Thereafter, the receiver 120 may return to the process of FIG. 3.

Referring back to FIG. 3, at operation 320, the receiver 120 may receive a signal from the transmitter 110. According to one embodiment, the receiver 120 may receive a signal using RF beamforming. The receiver 120 may perform RF beamforming based on an RF beamforming matrix ($W_u^{RF} \in \square^{N_r \times N_{RF}^r}$) in accordance with the number of Rx antennas 121, for example, $N_r$. According to another embodiment, the receiver 120 may receive a signal using RF beamforming and baseband beamforming. The receiver 120 may perform RF beamforming based on the RF beamforming matrix ($W_u^{RF} \in \square^{N_r \times N_{RF}^r}$) in accordance with the number of Rx antennas 121, for example, $N_r$, and may additionally baseband beamforming based on a baseband beamforming matrix ($W_u^{BB} \in \square^{N_{RF}^r \times L_u}$) in accordance with the number of reception processors, for example, $N_{RF}^r$. Furthermore, the reception processor 123 may receive at least one stream allocated to the receiver 120, for example, $L_u$ streams, and may compensate for a delay for the stream.

Figure 5:
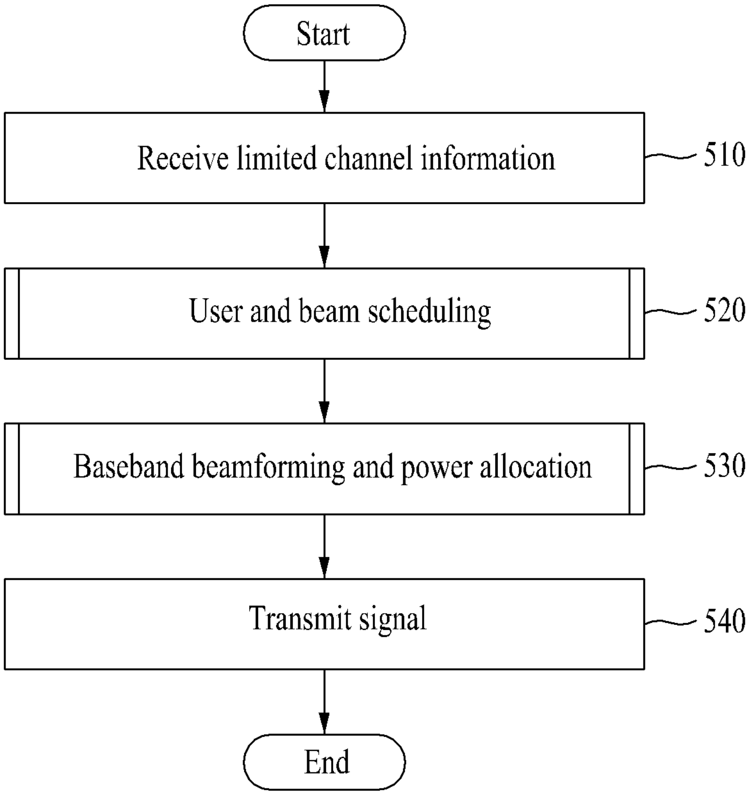
FIG. 5 is a diagram illustrating an operating method of a transmitter according to various embodiments.

FIG. 5 is a diagram illustrating an operating method of the transmitter 110 according to various embodiments.

Referring to FIG. 5, at operation 510, the transmitter 110 may receive limited channel information from all receives, that is, U receivers 120. At operation 520, the transmitter 110 may select at least any one of the receivers 120 using the limited channel information, and may schedule a RF beam for at least one stream in the selected receiver 120. In this case, the transmitter 110 may schedule the transmitter 110 and a RF beam therefor in a beam domain so that inter-symbol interference and inter-stream interference are mitigated. Furthermore, the transmitter 110 may configure the RF beamforming matrix ($F^{RF}$) of the transmitter 110 and the RF beamforming matrix ($W_u^{RF}$) of the receiver 120. In this case, column vectors that configure the RF beamforming matrix ($F^{RF}$) of the transmitter 110 and the RF beamforming matrix ($W_u^{RF}$) of the receiver 120 may be selected within a given beam codebook. The receivers 120, that is, $L_u>0$, may correspond to the selected receivers 120. A different number of streams may be allocated to each receiver 120 based on a channel state.

Figure 6:
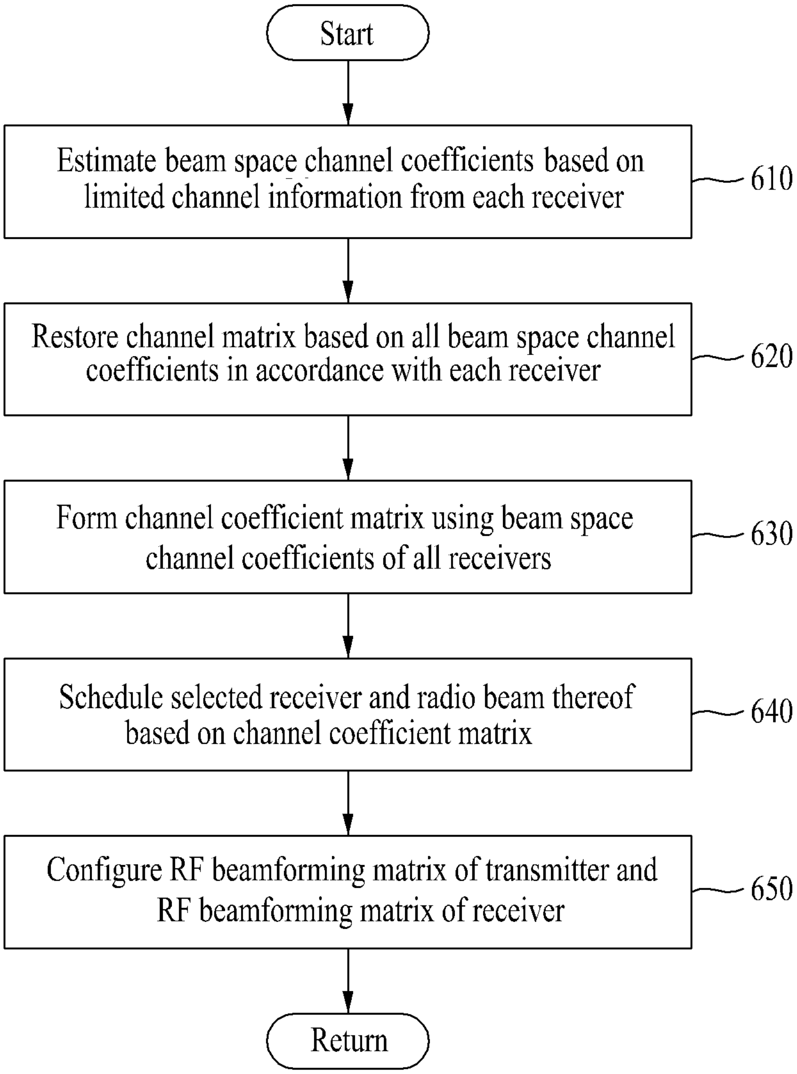
FIG. 6 is a diagram illustrating a user and beam scheduling operation of FIG. 5.
Figure 7:
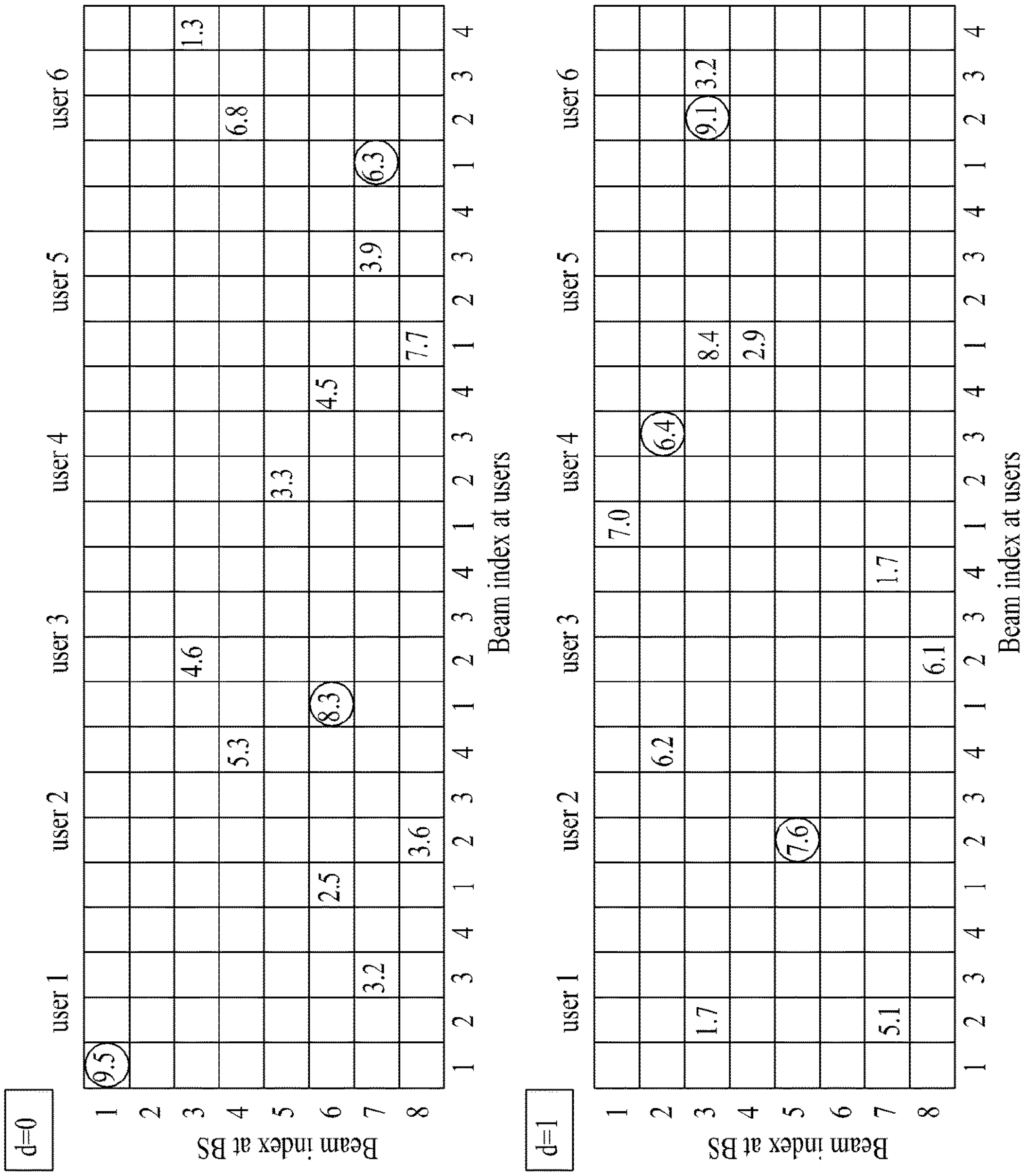
FIG. 7 is a diagram for describing the user and beam scheduling operation of FIG. 5.

FIG. 6 is a diagram illustrating a user and beam scheduling operation of FIG. 5. FIG. 7 is a diagram for describing the user and beam scheduling operation of FIG. 5.

Referring to FIG. 6, at operation 610, the transmitter 110 may estimate a beam space channel coefficient ($\hat{s}_{u,d}$) for each of the receivers 120 based on the limited channel information. The transmitter 110 may estimate beam space channel coefficients ($\hat{s}_{u,d}$) configured with a predetermined number of elements, for example, $N_f$ elements and $(N_tN_r-N_f)$ 0s based on the limited channel information. At operation 620, the transmitter 110 may restore a channel matrix ($\hat{H}_{u,d}$) based on all the beam space channel coefficients ($\hat{s}_{u,d}$) in accordance with each of the receivers 120. The transmitter 110 may restore the channel matrix ($\hat{H}_{u,d}$) based on the beam space channel coefficients ($\hat{s}_{u,d}$) like Equation 12.

$$\hat{H}_{u,d} = \sum_{n=1}^{N_f} \hat{s}_{u,d,i_n} H^{(i_n)}, \forall u. \quad \text{[Equation 12]}$$

In Equation 12, $\hat{s}_{u,d,i_n}$ may indicate an element having an n-th size among $\hat{s}_{u,d}$ elements.

At operation 630, the transmitter 110 may form a channel coefficient matrix ($\bar{G}_d$) using the beam space channel coefficients ($\hat{s}_{u,d}$) of all receivers, that is, the U receivers 120. The transmitter 110 may form the channel coefficient matrix ($\bar{G}_d$) like Equation 13.

$$\bar{G}_d = [\bar{G}_{1,d}^T, \ldots, \bar{G}_{U,d}^T], d=0, \ldots, D-1 \quad \text{[Equation 13]}$$

In Equation 13, $\bar{G}_{u,d}$ may be defined using the elements of the beam space channel coefficient ($\hat{s}_{u,d}$) like Equation 14. When $\bar{G}_{u,d}$ is configured, a value of each element smaller than a threshold ($\gamma_u$) may be processed as 0.

$$\bar{G}_{u,d}^T = vec^{-1}\left(\left[f_u(|\hat{s}_{u,d,1}|^2), \ldots, f_u(|\hat{s}_{u,d,N_tN_r}|^2)\right]^T\right) \in \square_+^{N_t \times N_r} \quad \text{[Equation 14]}$$

$$\left(\text{with } f_u(x) \square q_u \log_2\left(1 + \frac{SNR}{N_{RF}^t} x\right)\right)$$

At operation 640, the transmitter 110 may schedule a RF beam (n*) in each of the selected receivers 120 based on the channel coefficient matrix ($\bar{G}_d$). In this case, the transmitter 110 may select the delay component (d*), row (m*) and column (l*) of an element having the largest magnitude in the channel coefficient matrix ($\bar{G}_d$) like Equation 15. Thereafter, the transmitter 110 may select the receiver (u*) 120 based on the selected column (l*) and the number of Rx antennas 121 ($N_r$) like Equation 16. Furthermore, the transmitter 110 may determine a RF beam (n*) for the selected receiver (u*) 120 based on the selected column (l*), the number of Rx antennas 121 ($N_r$), and the selected receiver (u*) 120 like Equation 17. Accordingly, the transmitter 110 may configure a combination of the selected receiver (u*) 120, the selected delay component (d*), the determined RF beam index at the selected receiver (n*), and the selected RF beam index at the transmitter (m*) as a combination ($\Omega_{sel} = \Omega_{sel} \cup \{(u^*, d^*, n^*, m^*)\}$) of the RF beam (n*).

$$(d^*, m^*, l^*) \leftarrow \underset{d,m,l}{\operatorname{argmax}} [\bar{G}_d]_{m,l} \quad \text{[Equation 15]}$$

$$u^* = \left\lceil \frac{l^*}{N_r} \right\rceil \quad \text{[Equation 16]}$$

$$n^* = l^* - (u^* - 1)N_r \quad \text{[Equation 17]}$$

According to one embodiment, the transmitter 110 may convert columns having a value not 0, in the selected row (m*) of a channel coefficient matrix $$\left(\sum_{d=0}^{D-1} \overline{\overline{G}}_d\right),$$

into 0, and may convert rows having a value not 0, in the selected column (l*) of the channel coefficient matrix $$\left(\sum_{d=0}^{D-1} \overline{\overline{G}}_d\right),$$

into 0. Accordingly, the column and row having 0 in the channel coefficient matrix $$\left(\sum_{d=0}^{D-1} \overline{\overline{G}}_d\right)$$

are excluded from scheduling, and thus inter-symbol interference and inter-stream interference can be controlled. In order to consider the number of reception processors such as the RF chains of all receivers, that is, K selected receivers 120, for example, all the columns of a channel coefficient matrix ($\overline{G}_d$,∀d) corresponding to receivers 120 from which $N_{RF}^r$ beams have been selected may be converted into 0. This may be repeated until the number of RF beams to be transmitted with respect to the remaining values of the channel coefficient matrix ($\overline{G}_d$,∀d) becomes $N_{RF}^t$ or all the columns of the channel coefficient matrix ($\overline{G}_d$,∀d) not 0 disappear, for example.

For example, the transmitter 110 may obtain scheduling results, such as those illustrated in FIG. 7. Assuming that the number of Tx antennas 111 ($N_t$), the number of Rx antennas 121 ($N_r$) and the number of delay components (D) are 8, 4 and 2, respectively, the elements of channel coefficient matrices ($\overline{G}_0$, $\overline{G}_1$) may be obtained as illustrated in FIG. 7. In this case, the number of streams allocated to the receivers 120, that is, users, may be represented as $\{L_u\}_{u=1}^{U}=\{1,1,1,1,0,2\}$, and a set of receivers 120 selected from the receivers may be represented as U={1,2,3,4,6}.

At operation 650, the transmitter 110 may configure the RF beamforming matrix ($F^{RF}$) of the transmitter 110 and the RF beamforming matrix ($W_u^{RF}$) of the receiver 120 using a combination of ($\Omega_{sel}=\Omega_{sel}\cup\{(u^*,d^*,n^*,m^*)\}$) of the scheduled RF beam (n*). In this case, a delay component (d*) may be compensated in the receiver 120. Thereafter, the transmitter 110 may return to FIG. 5.

According to one embodiment, the transmitter 110 may select at least any one of the receivers 120 using the limited channel information based on an algorithm represented like Table 1, and may schedule a RF beam for at least one stream in the selected receiver 120.

---

Require: $\gamma_u$, $\{|\hat{s}_{u,d,i}|\}_{i=1}^{N_tN_r}$, ∀u, d
Step 1: Initialization
1: $G_{u,d}^T \leftarrow \mathrm{vec}^{-1}([f_u(|\hat{s}_{u,d,l}|^2), \ldots, f_u(|\hat{s}_{u,d,N_tN_r}|^2)]^T)$, ∀u, d
2: ∀u, d, n, m,
$[\overline{G}_{u,d}]_{n,m} \leftarrow 0$ if $[\overline{G}_{u,d}]_{n,m} < \gamma_u$ -continued 3: $\overline{G}_d \leftarrow [\overline{G}_{l,d}^T | \ldots | \overline{G}_{U,d}^T] \in R_+^{N_t x U N_r}$, ∀d
4: $\Omega_{sel} \leftarrow \emptyset$: The set of selected combinations
Step 2: Iteration loop for scheduling
5: while $|\Omega_{sel}| < N_{RF}^t$ and $\Sigma_d \overline{\overline{G}}_d \neq 0_{N_t x U N_r}$ do
6: $(d^*, m^*, l^*) \leftarrow \operatorname{argmax}_{d,m,l}\{[\overline{\overline{G}}_d]_{m,l}\}$
7: $u^* \leftarrow \left[\frac{l^*}{N_r}\right]$: Selected user index.
8: $n^* \leftarrow 1^* - (u^* - 1)N_r$: Selected beam index at user.
9: $\Omega_{sel} \leftarrow \Omega_{sel}$ U {(u*, d*, n*, m*)}
10: Set the columns of $\overline{G}_d$'s having a non-zero in the m*th row of $\Sigma_d\overline{\overline{G}}_d$ as zero.
11: Set the rows of $\overline{G}_d$'s having a non-zero in the l*th column $\overline{G}_d$'s as zero.
12: Set the columns of $\overline{G}_d$'s corresponding to the users who have been selected by $N_{RF}^t$ times as zero.
13: end while
Step 3: Construction of RF beaming matrix
14: u ← {u ∈ $\Omega_{sel}^{(1)}$}
15: F ← {$\bar{f}_m$|m ∈ $\Omega_{sel}^{(4)}$}
16: Wu ← {$\overline{w}_n$|(u, n) ∈ $\Omega_{sel}^{(1,3)}$}, ∀u ∈ u
17: $F^{RF} \leftarrow [f_l^{RF} | \ldots | f_{|F|}^{RF}]$, $f_j^{RF} \in F$
18: $W_u^{RF} \leftarrow [w_{u,l}^{RF} | \ldots | w_{u,|W_u|}^{RF}]$, $w_{u,j}^{RF} \in W_u$, ∀u ∈ u
19: $\{d_{u,n'}^*\}_{n'=1}^{L_u} \leftarrow \{d = 0, \ldots D - 1 \,|(u, d) \in \Omega_{sel}^{(1,2)}\}$ ∀u ∈ u
Return: u, $F^{RF}$, $W_u^{RF}$, $\{d_{u,r'}^*\}_{n'=1}^{L_u}$, ∀u ∈ u

---

In this case, the set $\Omega_{sel}^{(a)}$ may indicate a set of only a-th elements in each tuple belonging to the set $\Omega_{sel}$. The set $\Omega_{sel}^{(a,b)}$ may indicate a set of index pairs of only an a-th element and a b-th element in each tuple belonging to the set $\Omega_{sel}$.

Referring back to FIG. 5, at operation 530, the transmitter 110 may perform baseband beamforming based on the RF beam. In this case, the transmitter 110 may design the baseband beamforming matrix ($F^{BB}$) of the transmitter 110. Specifically, the transmitter 110 may design the baseband beamforming matrix ($F^{BB}$) of the transmitter 110 using the RF beamforming matrix ($F^{RF}$) of the transmitter 110 and the RF beamforming matrix ($W_u^{RF}$) of the receiver 120. Furthermore, the transmitter 110 may allocate power to the RF beamforming matrix ($F^{RF}$) and baseband beamforming matrix ($F^{BB}$) of the transmitter 110.

Figure 8:
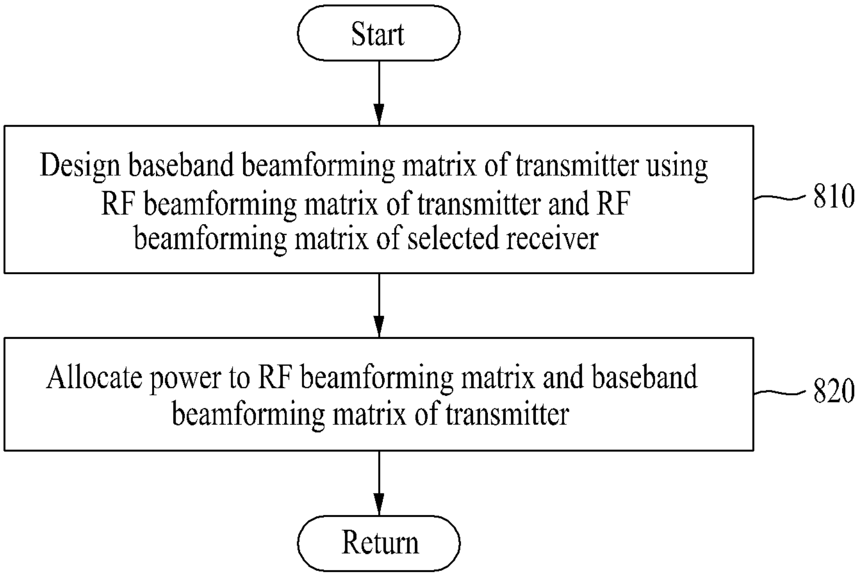
FIG. 8 is a diagram illustrating a baseband beamforming and power allocation operation of FIG. 5.

FIG. 8 is a diagram illustrating a baseband beamforming and power allocation operation of FIG. 5.

Referring to FIG. 8, at operation 810, the transmitter 110 may design the baseband beamforming matrix ($F^{BB}$) of the transmitter 110 using the RF beamforming matrix ($F^{RF}$) of the transmitter 110 and the RF beamforming matrix ($W_u^{RF}$) of the receiver 120. According to one embodiment, assuming that the receiver 120 uses only RF beamforming ($W_u^{BB}=I_{L_u}$), the transmitter 110 may design the baseband beamforming matrix ($F^{BB}$) of the transmitter 110 like Equation 18 so that a signal to leakage plus noise ratio (SLNR) is maximized.

$$F^{BB}=[F_1^{BB}| \ldots |F_U^{BB}] \quad \text{[Equation 18]}$$

In Equation 18, $F_u^{BB}=[f_{u,1}^{BB}| \ldots |f_{u,L_u}^{BB}]$ is a baseband beamforming matrix for a u-th receiver 120. Each vector component may be designed like Equation 19.

$$f_{u,n}^{BB}=c_{u,n}((F^{RF})^H A_{u,n} F^{RF})^{-1}(F^{RF})^H H_{u,d^*_{u,n}}^H w_{u,n}^{RF}, \quad \text{[Equation 19]}$$

In Equation 19, $w_{u,n}^{RF}$ is the n-th column vector of $W_u^{RF}$, and the matrix $A_{u,n}$ may be defined like Equation 20.

$$A_{u,n} = \sum_{d=0, d \neq d_{u,n}^*}^{D-1} H_{u,d}^H w_{u,n}^{RF} (w_{u,n}^{RF})^H H_{u,d} +$$ [Equation 20]

$$\sum_{l=1, l \neq n}^{L_u} \sum_{d=0}^{D-1} H_{u,d}^H w_{u,l}^{RF} (w_{u,l}^{RF})^H H_{u,d} +$$

$$\sum_{j \in U, j \neq u} \sum_{l=1}^{L_j} \sum_{d=0}^{D-1} H_{u,d}^H w_{j,l}^{RF} (w_{j,l}^{RF})^H H_{u,d} + \frac{LP_n}{P_t} I$$

In this case, $c_{u,n}$ may indicate a constant for satisfying $\|F^{RF} f_{u,n}^{BB}\| = 1$.

At operation 820, the transmitter 110 may allocate power to the RF beamforming matrix ($F^{RF}$) and baseband beamforming matrix ($F^{BB}$) of the transmitter 110. In this case, the transmitter 110 may allocate power to the RF beamforming matrix ($F^{RF}$) and baseband beamforming matrix ($F^{BB}$) of the transmitter 110 based on a power allocation algorithm for maximizing a weighted sum rate under the Tx power limit condition of the transmitter 110. To this end, for example, Equation 21 may be defined. An algorithm using an iterative water-filling method, such as Equation 22, may be proposed based on Equation 21. Thereafter, the transmitter 110 may return to FIG. 5.

$$a_{u,n} \Box |(w_{u,n}^{RF})^H H_{u,d_{u,n}^*} F^{RF} f_{u,n}^{BB}|^2$$ [Equation 21]

$$b_{u,n} \Box \sum_{d=0, d \neq d_{u,n}^*}^{D-1} |(w_{u,n}^{RF})^H H_{u,d} F^{RF} f_{u,n}^{BB}|^2$$

$$c_{u,n}^{(j,l)} \Box \sum_{d=0}^{D-1} |(w_{u,n}^{RF})^H H_{u,d} F^{RF} f_{j,l}^{BB}|^2$$

$$g_{u,n}(P) \Box \sum_{l=1, l \neq n}^{L_u} c_{u,n}^{(u,l)} p_{u,l} + \sum_{j \in U, j \neq u} \sum_{l=1}^{L_u} c_{u,n}^{(j,l)} p_{j,l} + P_n$$

$$t_{u,n}(P) \Box \sum_{l=1, l \neq n}^{L_u} \frac{q_u c_{u,n}^{(u,l)} p_{u,l}}{\eta_{u,l}(P)} + \sum_{j \in U, j \neq u} \sum_{l=1}^{L_u} \frac{q_j c_{u,n}^{(j,l)} p_{j,l}}{\eta_{j,l}(P)}$$

$$\eta_{u,n}(P) \Box \frac{(a_{u,n} + b_{u,n}) p_{u,n} + g_{u,n}(P)}{a_{u,n}}$$

$$\varepsilon_{u,n} \Box \frac{b_{u,n} p_{u,n}}{b_{u,n} p_{u,n} + g_{u,n}(P)}$$

$$p_{u,n} = \frac{1}{a_{u,n} + b_{u,n}} \left[ \frac{(1-\varepsilon_{u,n}) a_{u,n} q_u}{\lambda \log 2} - q_{u,n}(P) \right]^+,$$ [Equation 22]

$$\forall u, n$$

In Equation 22, $\lambda$ is a parameter indicative of a water level, and may satisfy a maximum Tx power condition.

According to one embodiment, the transmitter 110 may perform baseband beamforming and power allocation based on an algorithm represented like Table 2. In this case, the transmitter 110 may perform baseband beamforming and power allocation using Equation 19 and Equation 22.

TABLE 2

Require: $F^{RF}$, $W_u^{RF}$, $\{H_{u,d}\}_{d=0}^{D-1}$, $\{d_{u,n}^*\}_{n=1}^{L_u}$, $\forall u \in u$
Step 1: Initialization
$P \leftarrow \frac{P_t}{L} I$
$F^{BB} \leftarrow$ eq. (19)

TABLE 2-continued

Step 2: Initialization
  While $p_{u,n}$'s do not converge within maximum number of iterations
    Update $g_{u,n}$ (P) and $t_{u,n}$ (P)
    $(\lambda_{lo}, \lambda_{up}) \leftarrow (0, \lambda_{max})$
    While $\lambda |P_t - \Sigma_{u,n} p_{u,n}| > \delta$ within an iteration limit
      $\lambda \leftarrow \frac{(\lambda_{lo}, \lambda_{up})}{2}$
      $p_{u,n} \leftarrow$ eq. (22), $\forall u,n$
      If $\Sigma_{u,n} p > P_t$
        $\lambda_{lo} \leftarrow \lambda$
      Else
        $\lambda_{up} \leftarrow \lambda$
      End
    End
  End
Return $F^{BB}$, P Referring back to FIG. 5, at operation 540, the transmitter 110 may transmit a signal to the selected receiver 120. The transmitter 110 may transmit the signal by performing baseband beamforming based on the baseband beamforming matrix ($F^{BB}$) and performing RF beamforming based on the RF beamforming matrix ($F^{RF}$).

According to one embodiment, if the receiver 120 receives a signal using RF beamforming, the transmitter 110 may provide the receiver 120 with a codebook index for a RF beam. Furthermore, the transmitter 110 may transmit a signal to the receiver 120 using baseband beamforming and RF beamforming. Accordingly, the receiver 120 may receive the signal using RF beamforming based on the codebook index. According to another embodiment, if the receiver 120 receives a signal using RF beamforming and baseband beamforming, the transmitter 110 may provide the receiver 120 with information on a codebook index for a RF beam and the baseband beamforming matrix of the receiver 120. Furthermore, the transmitter 110 may transmit a signal to the receiver 120 using baseband beamforming and RF beamforming. Accordingly, the receiver 120 may receive the signal using RF beamforming based on the codebook index and using baseband beamforming based on the provided information.

According to various embodiments, feedback overhead from the receiver 120 to the transmitter 110 in the communication system 100 can be reduced in such a manner that the receiver 120 feedbacks limited channel information to the transmitter 110. In this case, the limited channel information may be extracted using the spatial characteristic of a channel and may be represented as a virtual beam domain.

According to various embodiments, multiple antennas can be used in the communication system 100 and hardware complexity and power consumption can be reduced because the transmitter 110 performs hybrid beamforming using baseband beamforming and RF beamforming together. In this case, spectral efficiency of the communication system 100 can be improved because each of the transmitter 110 and the receiver 120 uses multiple RF chains. According to one embodiment, the receiver 120 in addition to the transmitter 110 may use hybrid beamforming. Furthermore, the transmitter 110 may transmit multiple streams to the receiver 120. Furthermore, if the transmitter 110 performs beamforming to maximize a weighted sum rate, the priority of the receiver 120 or fairness between the receivers 120 can be incorporated.

According to various embodiments, by implementing the communication system 100 into a wideband mmWave beamforming system of a 5G mobile communication system, inter-symbol interference can be controlled even without using a cyclic prefix. Furthermore, a different number of streams can be allocated to each of the plurality of receivers 120 and a weight for each of the receivers 120 can be considered because the communication system 100 uses a wideband mmWave channel.

Accordingly, the communication system 100 and the operating method thereof according to various embodiments can be implemented based on a hybrid beamforming technology capable of controlling inter-symbol interference of a wideband channel using limited feedback information in the single carrier system 100.

The communication system 100 according to various embodiments may include at least one receiver 120 including at least one Rx antenna and configured to feedback limited channel information, and a transmitter 110 including a plurality of Tx antennas and configured to receive the limited channel information, schedule a RF beam for at least one stream in the receiver 120 using the limited channel information, and perform baseband beamforming based on the RF beam.

According to various embodiments, the receiver 120 may be configured to extract a beam space channel coefficient for each of delay components of a channel matrix, extract a predetermined number of elements from the beam space channel coefficient, configure the limited channel information using the extracted elements with respect to all the delay components of the channel matrix, and transmit the limited channel information to the transmitter 110.

According to various embodiments, the transmitter 110 may be configured to configure an RF beamforming matrix of the transmitter 110 and an RF beamforming matrix of the receiver 120.

According to various embodiments, the transmitter 110 may be configured to estimate a beam space channel coefficient for each of the receivers 120 based on the limited channel information, restore a channel matrix based on the beam space channel coefficient, form a channel coefficient matrix using the beam space channel coefficients of all the receivers 120, schedule the RF beam in each of the receivers 120 based on the channel coefficient matrix, and configure the RF beamforming matrix of the transmitter 110 and the RF beamforming matrix of the receiver 120 using a combination of the scheduled RF beams.

According to various embodiments, the transmitter 110 may be configured to select a delay component, row and column of an element having the largest magnitude in the channel coefficient matrix, select the receiver 120 based on the selected column and the number of Rx antennas, determine a RF beam for the selected receiver 120 based on the selected column, the number of Rx antennas and the selected receiver 120, and configure a combination of the selected receiver 120, the selected delay component, the determined RF beam and the selected row as a combination of the scheduled RF beams.

According to various embodiments, the transmitter 110 may be configured to convert columns having a value not 0 in the selected row of the channel coefficient matrix into 0 and to convert rows having a value not 0 in the selected column of the channel coefficient matrix into 0.

According to various embodiments, the transmitter 110 may be configured to design a baseband beamforming matrix of the transmitter 110 using the RF beamforming matrix of the transmitter 110 and the RF beamforming matrix of the receiver 120 and to perform the baseband beamforming based on the baseband beamforming matrix.

According to various embodiments, the transmitter 110 may be configured to allocate power to the RF beamforming matrix and baseband beamforming matrix of the transmitter 110.

According to one embodiment, the transmitter 110 may be configured to provide a codebook index for the RF beam to the receiver 120 and to transmit a signal to the receiver 120 using the baseband beamforming and RF beamforming.

According to one embodiment, the receiver 120 may be configured to receive the signal using RF beamforming based on the codebook index.

According to another embodiment, the transmitter 110 may be configured to provide the receiver 120 with information on a codebook index for the RF beam and a baseband beamforming matrix of the receiver 120 and to transmit a signal to the receiver 120 using the baseband beamforming and RF beamforming.

According to another embodiment, the receiver 120 may be configured to receive the signal using RF beamforming based on the codebook index and using baseband beamforming based on the provided information.

An operating method of the communication system 100 according to various embodiments may include receiving, by the transmitter 110 having a plurality of transmit (Tx) antennas, limited channel information from at least one receiver 120 each having at least one Rx antenna, scheduling, by the transmitter 110, a RF beam for at least one stream in the receiver 120 using the limited channel information, and performing, by the transmitter 110, baseband beamforming based on the RF beam.

According to various embodiments, the operating method may further include extracting, by the receiver 120, beam space channel coefficients with respect to each of delay components of a channel matrix, extracting, by the receiver 120, a predetermined number of elements from the beam space channel coefficients, configuring, by the receiver 120, the limited channel information using the extracted elements with respect to all the delay components of the channel matrix, and transmitting, by the receiver 120, the limited channel information to the transmitter 110.

According to various embodiments, in the scheduling of the RF beam, may configure a radio frequency (RF) beamforming matrix of the transmitter 110 and an RF beamforming matrix of the receiver 120 by the transmitter 110.

According to various embodiments, the scheduling of the RF beam may include estimating, by the transmitter 110, beam space channel coefficients for each of the receivers 120 based on the limited channel information, restoring, by the transmitter 110, a channel matrix based on the beam space channel coefficients, forming, by the transmitter 110, a channel coefficient matrix using the beam space channel coefficients of all the receivers 120, scheduling, by the transmitter 110, the RF beam in each of the receivers 120 based on the channel coefficient matrix, and configuring, by the transmitter 110, the RF beamforming matrix of the transmitter 110 and the RF beamforming matrix of the receiver 120 using a combination of the scheduled RF beams.

According to various embodiments, the scheduling of the RF beam may include selecting, by the transmitter 110, a delay component, row and column of an element having the largest magnitude in the channel coefficient matrix, selecting, by the transmitter 110, the receiver 120 based on the selected column and the number of Rx antennas, determining, by the transmitter 110, a RF beam for the selected receiver 120 based on the selected column, the number of Rx antennas and the selected receiver 120, and configuring, by the transmitter 110, a combination of the selected receiver 120, the selected delay component, the determined RF beam and the selected row as a combination of the scheduled RF beams.

According to various embodiments, the scheduling of the RF beam may further include converting, by the transmitter 110, columns having a value not 0 in the selected row of the channel coefficient matrix into 0, and converting, by the transmitter 110, rows having a value not 0 in the selected column of the channel coefficient matrix into 0.

According to various embodiments, the performing of the baseband beamforming may include designing, by the transmitter 110, a baseband beamforming matrix of the transmitter 110 using the RF beamforming matrix of the transmitter 110 and the RF beamforming matrix of the receiver 120 and performing, by the transmitter 110, the baseband beamforming based on the baseband beamforming matrix.

According to various embodiments, the performing of the baseband beamforming may further include allocating, by the transmitter 110, power to the RF beamforming matrix and baseband beamforming matrix of the transmitter 110.

According to various embodiments, the operating method may further include providing, by the transmitter 110, a codebook index for the RF beam to the receiver 120, transmitting, by the transmitter 110, a signal to the receiver 120 using the baseband beamforming and RF beamforming, and receiving, by the receiver 120, the signal using RF beamforming based on the codebook index.

According to various embodiments, the operating method may further include providing, by the transmitter 110, the receiver 120 with information on a codebook index for the RF beam and a baseband beamforming matrix of the receiver 120, transmitting, by the transmitter 110, a signal to the receiver 120 using the baseband beamforming and RF beamforming, and receiving, by the receiver 120, the signal using RF beamforming based on the codebook index and using baseband beamforming based on the provided information.

The embodiments of this document and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar elements. An expression of the singular number may include an expression of the plural number unless clearly defined otherwise in the context. In this document, an expression, such as "A or B", "at least one of A or/and B", "A, B or C" or "at least one of A, B and/or C", may include all of possible combinations of listed items together. Expressions, such as "a first," "a second," "the first" and "the second", may modify corresponding elements regardless of the sequence and/or importance, and are used to only distinguish one element from the other element and do not limit corresponding elements. When it is described that one (e.g., first) element is "(operatively or communicatively) connected to" or "coupled with" the other (e.g., second) element, one element may be directly connected to the other element or may be connected to the other element through another element (e.g., third element).

The "module" used in this document includes a unit configured with hardware, software or firmware, and may be interchangeably used with a term, such as logic, a logical block, a part or a circuit. The module may be an integrated part, a minimum unit to perform one or more functions, or a part thereof. For example, the module may be configured with an application-specific integrated circuit (ASIC).

Various embodiments of this document may be implemented in the form of software including one or more instructions stored in a storage medium readable by a machine (e.g., the transmitter 110, the receiver 120). For example, the processor of the machine may fetch at least one of one or more stored instructions from a storage medium, and may execute the one or more instructions. This enables the machine to perform at least one function based on the fetched at least one instruction. The one or more instructions may include code generated by a complier or code executable by an interpreter. The storage medium readable by the machine may be provided in the form of a non-transitory storage medium. In this case, 'non-transitory' means that a storage medium is a tangible device and does not include a signal (e.g., electromagnetic waves). The term is not used regardless of whether data is semi-persistently stored in a storage medium and whether data is temporally stored in a storage medium.

According to various embodiments, each (e.g., module or program) of the described elements may include a single entity or a plurality of entities. According to various embodiments, one or more of the aforementioned elements or operations may be omitted or one or more other elements or operations may be added. Alternatively or additionally, a plurality of elements (e.g., modules or programs) may be integrated into one element. In such a case, the integrated elements may perform one or more functions of each of a plurality of elements identically with or similar to that performed by a corresponding one of the plurality of elements before the elements are integrated. According to various embodiments, module, operations performed by a program or other elements may be executed sequentially, in parallel, repeatedly, or heuristically, or one or more of the operations may be executed in different order or may be omitted, or one or more other operations may be added.

According to various embodiments, feedback overhead from a receiver to a transmitter in a communication system can be reduced because the receiver feedbacks limited channel information to the transmitter.

According to various embodiments, multiple antennas can be used in a communication system and hardware complexity and power consumption can be reduced because a transmitter performs hybrid beamforming using baseband beamforming and RF beamforming together.

According to various embodiments, inter-symbol interference can be controlled even without a cyclic prefix because a communication system is implemented as a wideband mmWave beamforming system of a 5G mobile communication system.

Accordingly, the communication system and operating method thereof according to various embodiments can be implemented based on a hybrid beamforming technology capable of controlling inter-symbol interference of a wideband channel using limited feedback information in a single carrier system.

What is claimed is:

1. An operating method of a communication system, comprising:

receiving, by a transmitter comprising a plurality of transmit (Tx) antennas, limited channel information from at least one receiver each comprising at least one receive (Rx) antenna;

scheduling, by the transmitter, a RF beam for at least one stream in the receiver using the limited channel information;

performing, by the transmitter, baseband beamforming based on the RF beam;

extracting, by the receiver, beam space channel coefficients with respect to each of delay components of a channel matrix;

extracting, by the receiver, a predetermined number of elements from the beam space channel coefficients;

configuring, by the receiver, the limited channel information using the extracted elements with respect to all the delay components of the channel matrix; and transmitting, by the receiver, the limited channel information to the transmitter.

2. The operating method of claim 1, wherein the scheduling of the RF beam comprises configuring a radio frequency (RF) beamforming matrix of the transmitter and an RF beamforming matrix of the receiver by the transmitter.

3. The operating method of claim 2, wherein the scheduling of the RF beam comprises:

estimating, by the transmitter, beam space channel coefficients for each of the receivers based on the limited channel information;

restoring, by the transmitter, a channel matrix based on the beam space channel coefficients;

forming, by the transmitter, a channel coefficient matrix using the beam space channel coefficients of all the receivers;

scheduling, by the transmitter, the RF beam in each of the receivers based on the channel coefficient matrix; and configuring, by the transmitter, the RF beamforming matrix of the transmitter and the RF beamforming matrix of the receiver using a combination of the scheduled RF beams.

4. The operating method of claim 3, wherein the scheduling of the RF beam comprises:

selecting, by the transmitter, a delay component, row and column of an element having the largest magnitude in the channel coefficient matrix;

selecting, by the transmitter, the receiver based on the selected column and a number of Rx antennas;

determining, by the transmitter, a RF beam for the selected receiver based on the selected column, the number of Rx antennas and the selected receiver; and configuring, by the transmitter, a combination of the selected receiver, the selected delay component, the determined RF beam and the selected row as a combination of the scheduled RF beams.

5. The operating method of claim 4, wherein the scheduling of the RF beam further comprises:

converting, by the transmitter, columns having a value not 0 in the selected row of the channel coefficient matrix into 0; and converting, by the transmitter, rows having a value not 0 in the selected column of the channel coefficient matrix into 0.

6. The operating method of claim 2, wherein the performing of the baseband beamforming comprises:

designing, by the transmitter, a baseband beamforming matrix of the transmitter using the RF beamforming matrix of the transmitter and the RF beamforming matrix of the receiver; and performing, by the transmitter, the baseband beamforming based on the baseband beamforming matrix.

7. The operating method of claim 6, wherein the performing of the baseband beamforming comprises:

allocating, by the transmitter, power to the RF beamforming matrix and baseband beamforming matrix of the transmitter.

8. The operating method of claim 1, further comprising:

providing, by the transmitter, a codebook index for the RF beam to the receiver;

transmitting, by the transmitter, a signal to the receiver using the baseband beamforming and RF beamforming; and receiving, by the receiver, the signal using RF beamforming based on the codebook index.

9. The operating method of claim 1, further comprising:

providing, by the transmitter, the receiver with information on a codebook index for the RF beam and a baseband beamforming matrix of the receiver;

transmitting, by the transmitter, a signal to the receiver using the baseband beamforming and RF beamforming; and receiving, by the receiver, the signal using RF beamforming based on the codebook index and using baseband beamforming based on the provided information.

10. A communication system, comprising:

at least one receiver comprising at least one receive (Rx) antenna and configured to feedback limited channel information; and a transmitter comprising a plurality of transmit (Tx) antennas and configured to receive the limited channel information, schedule a RF beam for at least one stream in the receiver using the limited channel information, and perform baseband beamforming based on the RF beam, wherein the transmitter is configured to configure an RF beamforming matrix of the transmitter and an RF beamforming matrix of the receiver, wherein the transmitter is configured to:

estimate beam space channel coefficients for each of the receivers based on the limited channel information;

restore a channel matrix based on the beam space channel coefficients;

form a channel coefficient matrix using the beam space channel coefficients of all the receivers;

schedule the RF beam in each of the receivers based on the channel coefficient matrix; and configure the RF beamforming matrix of the transmitter and the RF beamforming matrix of the receiver using a combination of the scheduled RF beams.

11. The communication system of claim 10, wherein the receiver is configured to:

extract beam space channel coefficients for each of delay components of a channel matrix, extract a predetermined number of elements from the beam space channel coefficients, configure the limited channel information using the extracted elements with respect to all the delay components of the channel matrix, and transmit the limited channel information to the transmitter.

12. The communication system of claim 10, wherein the transmitter is configured to:

select a delay component, row and column of an element having the largest magnitude in the channel coefficient matrix;

select the receiver based on the selected column and a number of Rx antennas;

determine a RF beam for the selected receiver based on the selected column, the number of Rx antennas and the selected receiver; and configure a combination of the selected receiver, the selected delay component, the determined RF beam and the selected row as a combination of the scheduled RF beams.

13. The communication system of claim 12, wherein the transmitter is configured to:

convert columns having a value not 0 in the selected row of the channel coefficient matrix into 0; and convert rows having a value not 0 in the selected column of the channel coefficient matrix into 0.

14. The communication system of claim 10, wherein the transmitter is configured to:

design a baseband beamforming matrix of the transmitter using the RF beamforming matrix of the transmitter and the RF beamforming matrix of the receiver; and perform the baseband beamforming based on the baseband beamforming matrix.

15. The communication system of claim 14, wherein the transmitter is configured to allocate power to the RF beamforming matrix and baseband beamforming matrix of the transmitter.

16. The communication system of claim 10, wherein:

the transmitter is configured to provide a codebook index for the RF beam to the receiver and to transmit a signal to the receiver using the baseband beamforming and RF beamforming, and the receiver is configured to receive the signal using RF beamforming based on the codebook index.

17. The communication system of claim 10, wherein:

the transmitter is configured to provide the receiver with information on a codebook index for the RF beam and a baseband beamforming matrix of the receiver and to transmit a signal to the receiver using the baseband beamforming and RF beamforming, and the receiver is configured to receive the signal using RF beamforming based on the codebook index and using baseband beamforming based on the provided information.

18. An operating method of a communication system, comprising:

receiving, by a transmitter comprising a plurality of transmit (Tx) antennas, limited channel information from at least one receiver each comprising at least one receive (Rx) antenna;

scheduling, by the transmitter, a RF beam for at least one stream in the receiver using the limited channel information;

performing, by the transmitter, baseband beamforming based on the RF beam, wherein the scheduling of the RF beam comprises configuring a radio frequency (RF) beamforming matrix of the transmitter and an RF beamforming matrix of the receiver by the transmitter, wherein the performing of the baseband beamforming comprises:

designing, by the transmitter, a baseband beamforming matrix of the transmitter using the RF beamforming matrix of the transmitter and the RF beamforming matrix of the receiver; and performing, by the transmitter, the baseband beamforming based on the baseband beamforming matrix.

19. The operating method of claim 18, wherein the performing of the baseband beamforming comprises:

allocating, by the transmitter, power to the RF beamforming matrix and baseband beamforming matrix of the transmitter.

20. The operating method of claim 18, wherein the scheduling of the RF beam comprises:

estimating, by the transmitter, beam space channel coefficients for each of the receivers based on the limited channel information;

restoring, by the transmitter, a channel matrix based on the beam space channel coefficients;

forming, by the transmitter, a channel coefficient matrix using the beam space channel coefficients of all the receivers;

scheduling, by the transmitter, the RF beam in each of the receivers based on the channel coefficient matrix; and configuring, by the transmitter, the RF beamforming matrix of the transmitter and the RF beamforming matrix of the receiver using a combination of the scheduled RF beams.

* * * * *